United States Patent [19]
Davies

[11] Patent Number: 6,132,658
[45] Date of Patent: Oct. 17, 2000

[54] METHOD OF PULTRUDING A PART FROM FIBER REINFORCED RESIN WITH A WOOD GRAIN FINISH

[76] Inventor: Lawrence W. Davies, 1205 Sherwin Road, Winnipeg, Manitoba, Canada, R3H 0V1

[21] Appl. No.: 09/033,700

[22] Filed: Mar. 3, 1998

[51] Int. Cl.$^7$ ...................................................... B32B 31/08
[52] U.S. Cl. .................... 264/137; 264/171.24; 264/284; 264/293; 156/180; 156/209; 156/247
[58] Field of Search ..................... 264/137, 266, 264/171.24, 284, 293, 171.13, 271.1, 277; 156/180, 209, 247

[56] References Cited

U.S. PATENT DOCUMENTS

| | | | |
|---|---|---|---|
| 4,141,944 | 2/1979 | Anstadt et al. | 264/45.5 |
| 4,557,778 | 12/1985 | Held | 156/209 |
| 5,203,941 | 4/1993 | Spain et al. | 156/209 |
| 5,362,545 | 11/1994 | Tingley | 428/96 |
| 5,779,840 | 7/1998 | Boris | 156/234 |

FOREIGN PATENT DOCUMENTS

| 1190717 | 7/1985 | Canada | 156/180 |
|---|---|---|---|

*Primary Examiner*—Jill L. Heitbrink
*Assistant Examiner*—Edmund H. Lee
*Attorney, Agent, or Firm*—Adrian D. Battison; Murray E. Thrift; Michael R. Williams

[57] ABSTRACT

A wood grain finish to a pultruded part is obtained by applying to a surface of the part before entering the die a strip carrying male projections shaped in differential depths and spacing across the width of the part to form a simulated wood grain pattern. The strip is then removed after the part is set leaving recesses in the outside surface which provide a simulated wood grain finish which can be differentially stained.

3 Claims, 3 Drawing Sheets

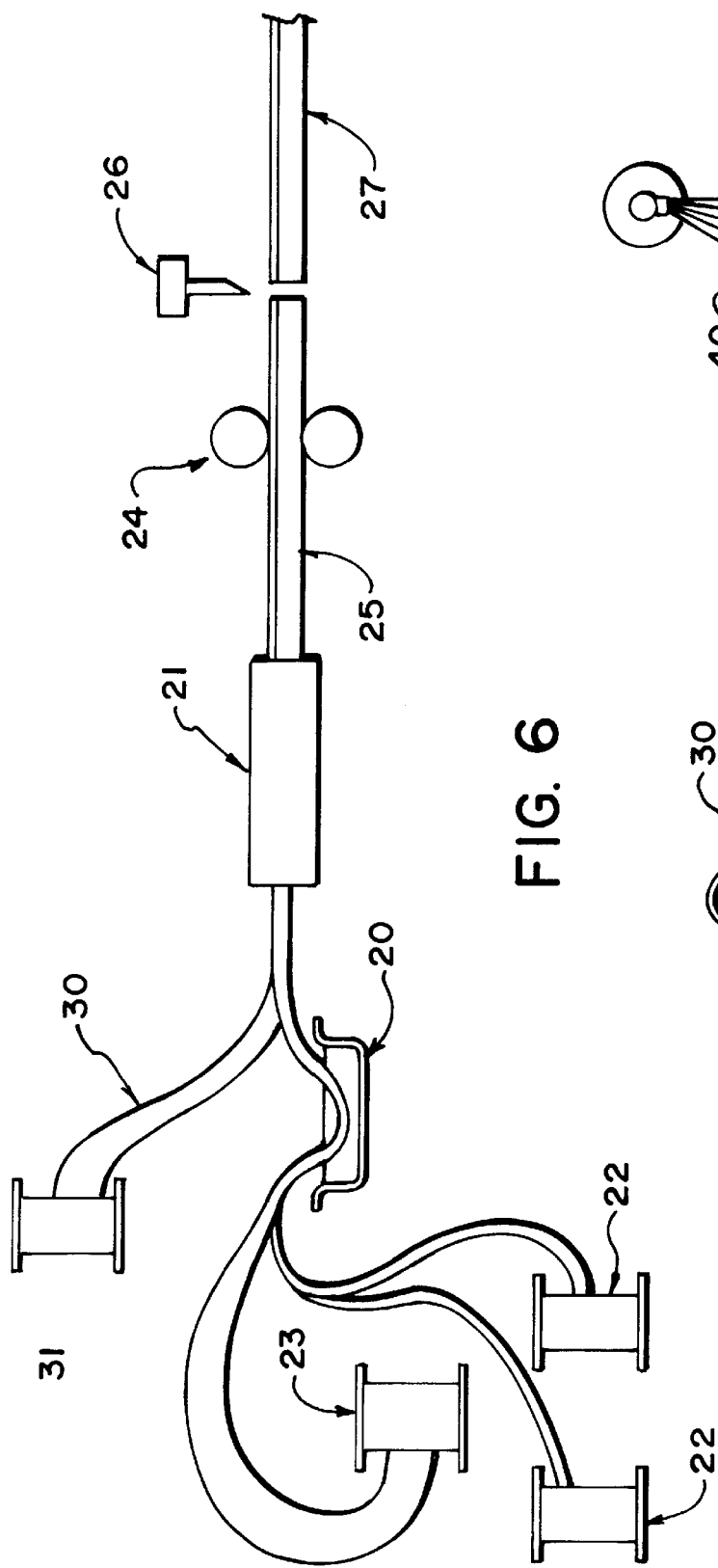
FIG. 6
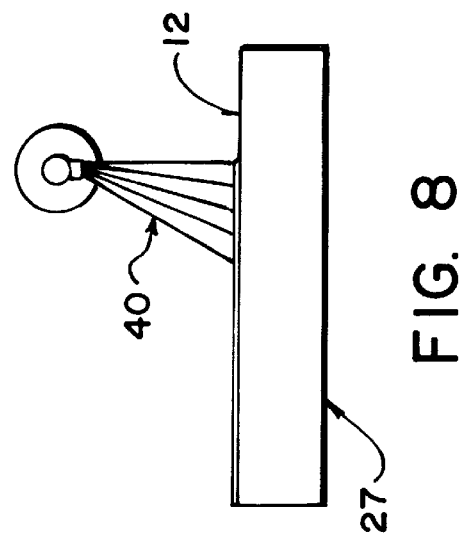
FIG. 8
FIG. 7

METHOD OF PULTRUDING A PART FROM FIBER REINFORCED RESIN WITH A WOOD GRAIN FINISH

This invention relates to a method of forming an elongate part by a process known generally as pultrusion by which the part can be formed with a wood grain finish.

BACKGROUND OF THE INVENTION

Pultrusion is a known technique in which longitudinally continuous fibrous elements, which can include roving and/or mat, are collated into a structure approximating in transverse cross section the required finished cross section of the part, following which the collated fibers are soaked in a settable resin and passed through a die to effect setting of the resin into the required finished cross section defined by the die with the resin being reinforced by the fibers carried through the die with the resin.

The technique of pultrusion has been used for many years for manufacturing various parts and in more recent years has been used in the manufacture of window frames in view of the structural qualities of the finished product.

However one ongoing problem with glass fiber reinforced resin window frames of this type is that of providing a suitable finish for the product which can simulate wood which is perceived to be a higher quality product. Various attempts have been made, therefore, to apply veneers to the finished product to provide a finishing layer of wood or simulated wood to provide the required high quality finish attracted to the customer. The application of veneers is complex and expensive and thus significantly increases the cost of the product.

In prior U.S. application Ser. No. 08/327,614 filed Oct. 24, 1994, now abandoned (now published as International application WO96/12611) is disclosed a technique in which a wood veneer is applied to the part during the pultrusion process so that the veneer is carried through the pultrusion die with the part as it is formed and is bonded to the part by the penetration of the resin into the interstices of the veneer. The veneer is protected on its outer surface by a covering layer so that the outside surface is intended to remain intact and of attractive appearance. However some difficulties have been encountered in preventing the penetration of the resin into the veneer sufficiently to mar the outside surface.

It is also known in pultrusion to provide a strip of a flexible carrier material which carries an abrasive or roughened surface such as fine sand which is passed with the part through the die on an outside surface of the part. The strip can then be removed from the part so that the abrasive surface is molded into the outside surface of the part and thus forms a relatively fine mat finish to the part thus avoiding the highly polished appearance which occurs normally due to the sliding action through the die. However this technique is used merely to provide a roughened or mat finish which is consistent across the full width of the area of the part required.

There remains therefore a requirement for a technique which enables a pultruded part to be formed with a wood grain finish so as to be able to simulate the high quality wood product without the necessity for attachment of veneers which are problematic.

SUMMARY OF THE INVENTION

According to the invention, therefore, there is provided method of forming an elongate part of constant transverse cross-section comprising: collating a plurality of substantially longitudinally continuous fibrous elements so as form a shape of the collated elements in transverse cross-section defining exposed surfaces of the shape; applying an unset resin into the elements such that the resin is carried by the elements on the elements and in interstices therebetween; providing a die having die surfaces matching said constant transverse cross-section of the part and arranged to shape the elements and the resin carried thereby into said constant transverse cross-section; pulling the elements and the resin carried thereby through the die to shape the elements and to effect setting of the resin; and applying to at least part of at least one of the exposed surfaces of the shape of the collated elements upstream of the die a flexible elongate strip so as to pass through the die with the collated elements, the strip having a first surface arranged in contact with said at least one surface and a second surface which is exposed for contacting the die surfaces as the collated elements pass through the die, with a width of the first surface of the strip being sufficient to cover said at least part of said at least one surface; the strip carrying a textured relief pattern of projecting elements on the first surface thereof having spacings between the projection elements and heights of the projecting elements which vary across the width of the first surface, with the projecting elements being arranged in a pattern to simulate a wood grain pattern.

One embodiment of the invention will now be described in conjunction with the accompanying drawings in which:

BRIEF DESCRIPTION OF THE DRAWINGS

FIGS. 5, 6, 7 and 8 show various depths in the pultrusion process for manufacturing of the part of FIGS. 1, 2, 3 and 4.

In the drawings like characters of reference indicate corresponding parts in the different figures.

DETAILED DESCRIPTION

Figure 1:
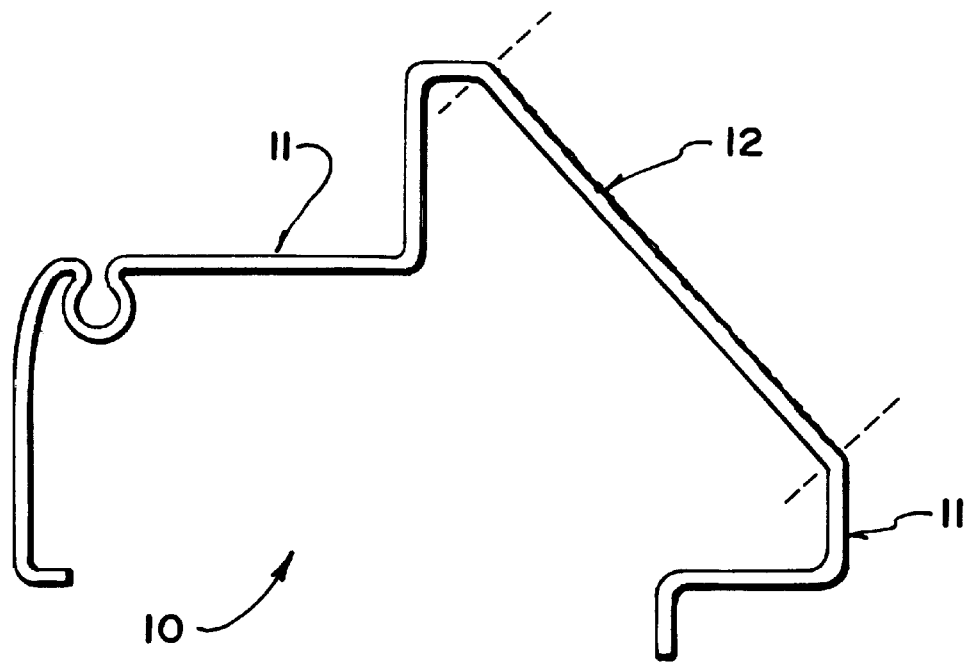
FIG. 1 is a cross section through a sample of a finished part manufactured by the pultrusion technique.
Figure 2:
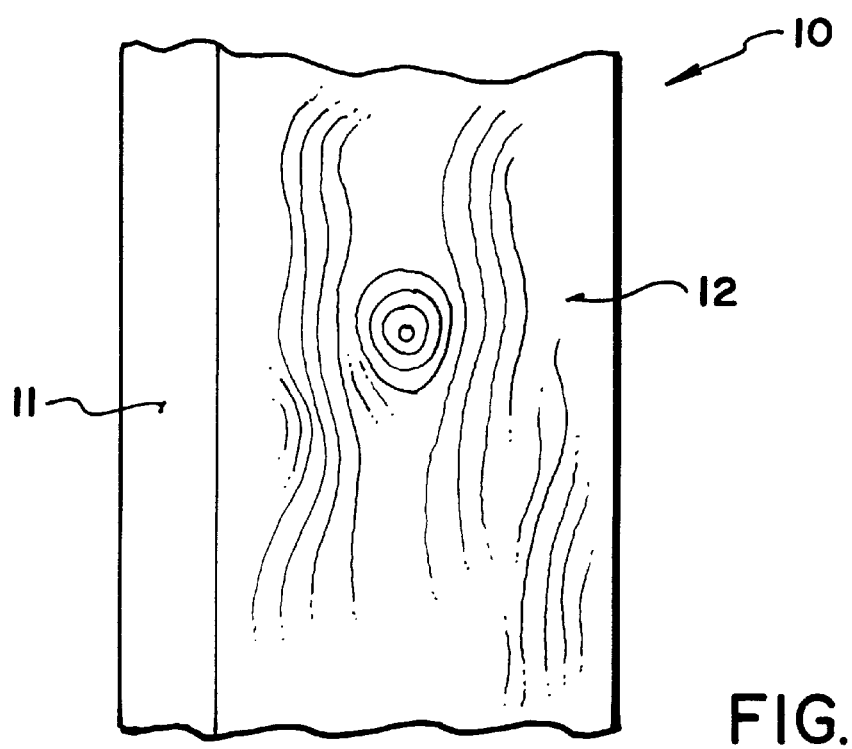
FIG. 2 is a top plan view of a portion of the part of FIG. 1 showing the covering strip removed and indicating schematically the wood grain finish in the area of the part on which it is required.

In FIGS. 1 and 2 is shown a sample pultruded profile generally indicated at 10, the cross-section of which is purely exemplary and will of course vary in accordance with requirements. The profile shown in FIG. 1 includes a main surface indicated at 11 which forms a main portion of the outer surface of the profile together with a second surface portion 12 which is required to provide an attractive appearance for the end use of the product. The second surface portion 12 is manufactured as set out hereinafter to provide the appearance of a wood grain finish as schematically indicated in FIG. 2.

The process for manufacturing of the part shown in FIGS. 1 and 2 is shown in FIGS. 5, 6, 7 and 8. In FIG. 6 is shown a pultrusion process including a bath 20 of a thermo setting resin and die 21 having a die cross section arranged to shape the part into a finished cross sectional shape as shown in FIG. 1.

Longitudinally continuous fibrous elements are fed into the die after passing through the bath 20 and include a plurality of reels 22 of a roving material and one or more reels 23 of a mat material. The fibrous elements are assembled into the required approximate shape necessary to enter the die 21 and are soaked with the resin from the bath 20 so as to enter the die under pulling force from a drive system 24 so that the resin is set in the die and the finished part emerges from the die as indicated at 25. A cutter 26 separates the part into a plurality of separate lengths 27.

In accordance with the present invention, an additional strip 30 is fed from a reel 31 into the die 21 with the assembled fibrous elements. The strip 30 is manufactured in the process shown in FIG. 5. In this process a supply reel 32 of a carrier sheet material 33 is unwound at an unwind stand. The carrier material carries a layer 36 of a material which can be heat and compression formed. The carrier sheet and the coating layer are both formed from a material which is resistant to the temperatures, of the order of 400 degrees F., used in pultrusion. The carrier sheet can be formed of a woven nylon. The coating layer can be applied by any suitable process. In one example, the carrier sheet is passed through a coating system generally indicated at 34. The coating system includes a coating application device 35 which can as schematically indicated apply the coating by a spray process or the coating may be applied by a gravure roller and doctor blade system thus providing a layer 36 of a coating material on the carrier sheet 33. The coating material 36 in the layer is shaped using heat and pressure applied by a wheel 37 having female indentations 38 thus causing the coating layer to be deformed into a relatively smooth layer with a series of male projections 39. When set so the coating layer is fixed with the projects thereon, the carrier strip 33 with the layer thereon is rolled into the reel 31 for supply to the process as shown in FIG. 6.

A suitable material for use as the carrier strip is known as "Release Paper" and is available from S. D. Warren Company of 199 Wells Avenue Newton Mass. and this can be formed into strips and passed through the die as described herein.

The strip 3 is then supplied into the process of FIG. 6 so that the layer 36 with the projections 39 thereon is laid onto the outside surface of the part prior to entry into the die. Thus the strip is carried with the part through the die so that the resin from the bath is deformed by the projections 39 so as to take up the shape of the projections 39 in the outside surface of the resin.

As shown in FIGS. 7 and 8, downstream of the cutting process and generally subsequent to the further processing of the part 27 for assembly into the finished product, the strip 30 is removed from the surface of the part and, as shown in FIG. 8, a stain or paint 40 is applied to the surface 12 for penetration into the recesses formed in the outside surface by the projections 39. The stain or paint 40 is thus taken up differentially by the recesses to provide a stained or painted surface having the appearance of the wood grain.

Figure 3:
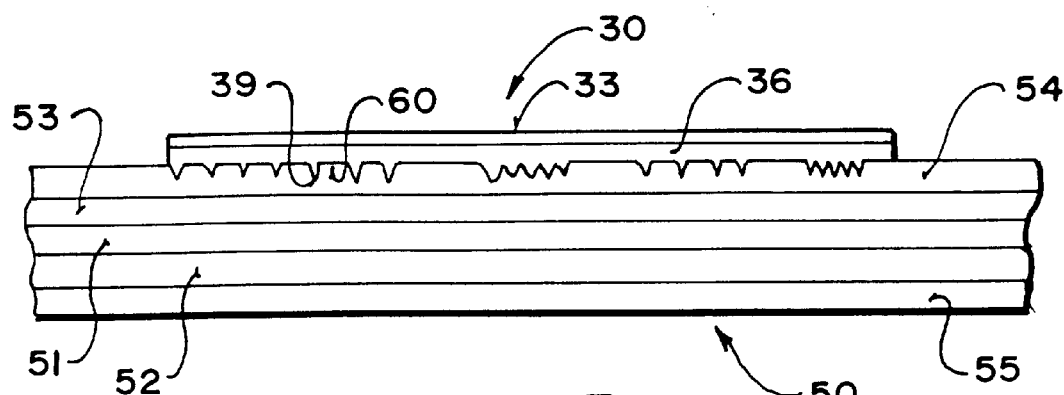
FIG. 3 is a cross sectional view through the part of FIG. 1 on an enlarged scale showing the components of the structure.
Figure 4:
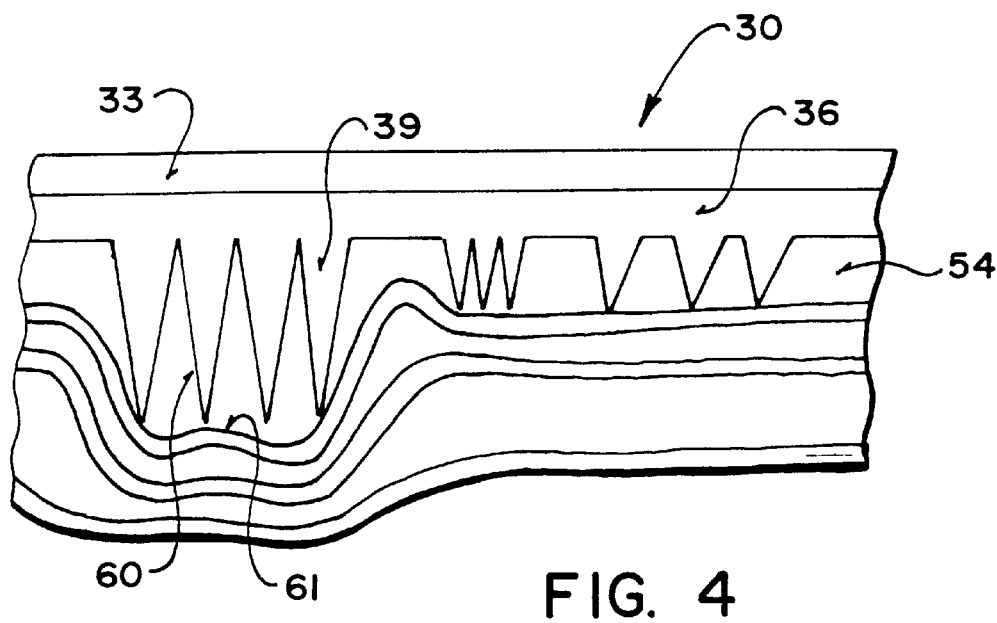
FIG. 4 is a cross sectional view similar to that of FIG. 3 on a yet further increased scale.
Figure 5:
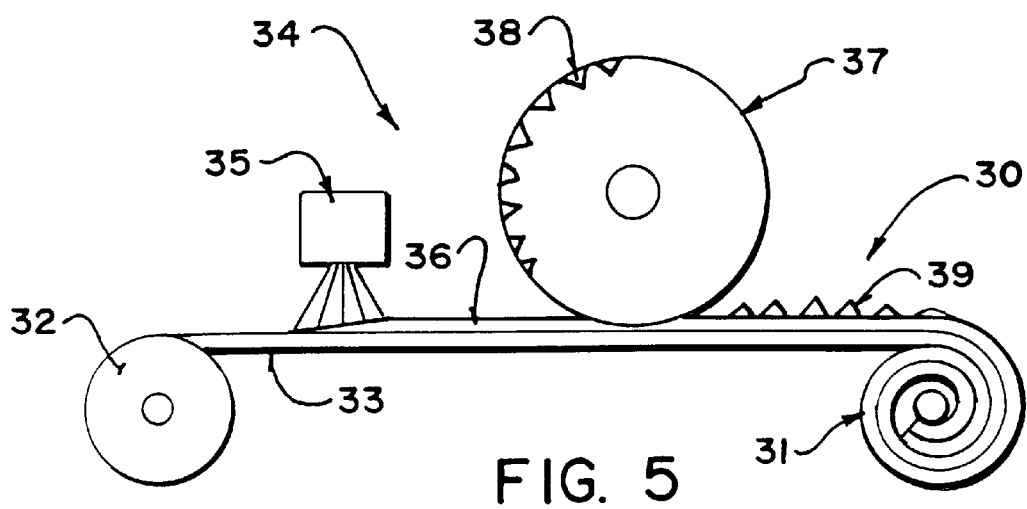

As shown in FIGS. 3 and 4, the effect of the projections is shown in more detail. Thus the part 25 includes a wall 50 formed from a layer 51 of the rovings 22 and at least one layer 52, 53 of the mat 23. On the outside surface is a layer 54, 55 of resin.

The strip 30 includes the carrier layer 33 and the coating layer 36 which includes the projections 39 so as to form recesses in the resin layer 54. The recesses 60 of course match the shape of the projection 39 and are varied in depth and in transverse spacing across the width of the strip so as to provide adjacent recesses of different depths and different spacing which thus take up the stain 40 to different amounts.

As shown in FIG. 4, the projections 39 engage fibers 61 of the layer 53 so as to push those fibers away from the surface and to form the resin layer 54. In this way the fibers are prevented from being exposed at the surface of the part when the strip 30 is removed or peeled away. It will be appreciated that in a normal pultrusion process, the fibers are free to float within the resin and therefore take up positions immediately adjacent the surface. In the pultrusion process of the present invention the fibers are pushed away from the surface so that they are prevented from entering the recesses 60 formed as the female pattern of the male projections 39. When the strip is peeled away, the fibers remain buried within the resin where they have been pushed by the projections and the resin remains in place.

The recesses 60 will generally have variable depths between 0.003 and 0.009 inch in depth, and variable widths and spacings suitable to simulate a wood grain pattern.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A method of forming an elongate part of constant transverse cross-section comprising:

collating a plurality of substantially longitudinally continuous fibrous elements;

the elements including at least one layer of a mat material and at least one layer of longitudinally continuous rovings;

forming an initial shape of the collated elements in constant transverse cross-section defining at least one exposed surface of the initial shape with the layer of mat material adjacent the at least one exposed surface and the at least one layer of rovings spaced from the at least one exposed surface by the at least one layer of mat material that is adjacent the at least one exposed surface;

applying an unset resin onto the elements such that the resin is carried by the elements and in interstices therebetween;

providing a die having die surfaces matching said constant transverse cross-section of the part;

effecting a pulling force such that the elements and the unset resin are pulled thereby through the die;

causing the die surfaces to form the collated elements and the unset resin carried thereby from the initial shape into a finished shape having said constant transverse cross-section;

causing the die to effect setting of the unset resin;

and, prior to the collated elements and the unset resin applied thereto passing through the die, applying to at least part of the at least one exposed surface of the initial shape upstream of the die a flexible elongate strip so as to pass through the die with the collated elements and the unset resin applied thereto, the strip having a first surface arranged in contact with the unset resin applied to said at least one exposed surface of the initial shape and a second surface which is exposed for contacting the die surfaces as the collated elements and the unset resin applied thereto pass through the die, with a width of the first surface of the strip being sufficient to cover said at least part of said at least one exposed surface;

the strip carrying a textured relief pattern of projecting elements on the first surface thereof;

the protecting elements having spacings therebetween which vary across the width of the first surface and the projecting elements having heights which vary across the width of the first surface, with the projecting elements being arranged in a pattern to simulate a wood grain pattern;

and causing said projecting elements to display resin and fibers in the mat material in a direction away from the at least one exposed surface such that a molded pattern is formed in the resin when set by said projecting elements and such that said molded pattern is formed substantially wholly of said resin with no fibers being exposed in said molded pattern.

2. The method according to claim 1 including, after the resin is set, removing the strip to expose the molded pattern.

3. The method according to claim 2 including, after the strip is removed, applying a stain material to said at least a part of said at least one exposed surface such that the stain material is taken up differentially by the molded pattern to simulate a stained wood material.

* * * * *